(12) United States Patent
Kwon et al.

(10) Patent No.: US 10,409,113 B2
(45) Date of Patent: Sep. 10, 2019

(54) LIQUID CRYSTAL DISPLAY

(75) Inventors: Oh-Jeong Kwon, Hwaseong-si (KR); Jae-Hong Park, Seoul (KR); Sung-Jae Yun, Hwaseong-si (KR); Hyeok Jin Lee, Seongnam-si (KR); Jiang Shuai, Yongin-si (KR); Kyung Hye Park, Seongnam-si (KR); Joo Young Yoon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 63 days.

(21) Appl. No.: 13/569,046

(22) Filed: Aug. 7, 2012

(65) Prior Publication Data

US 2013/0278877 A1    Oct. 24, 2013

(30) Foreign Application Priority Data

Apr. 19, 2012    (KR) .................... 10-2012-0041144

(51) Int. Cl.
| | | |
|---|---|---|
| *G02F 1/1337* | (2006.01) | |
| *G02F 1/1343* | (2006.01) | |
| *G02F 1/139* | (2006.01) | |

(52) U.S. Cl.
CPC .. *G02F 1/133707* (2013.01); *G02F 1/134309* (2013.01); *G02F 1/1393* (2013.01); *G02F 2001/133757* (2013.01)

(58) Field of Classification Search
CPC .................................................. G02F 1/1337
USPC ................. 349/130, 129, 142, 123
See application file for complete search history.

(56) References Cited

U.S. PATENT DOCUMENTS

| | | | | |
|---|---|---|---|---|
| 5,309,264 A | * | 5/1994 | Lien ................. | G02F 1/134336 349/130 |
| 6,057,905 A | * | 5/2000 | Nakajima ..................... | 349/146 |
| 6,222,595 B1 | * | 4/2001 | Zhang .............. | G02F 1/134336 349/139 |

(Continued)

FOREIGN PATENT DOCUMENTS

| | | |
|---|---|---|
| CN | 101568875 | 10/2009 |
| CN | 102236211 | 11/2011 |

(Continued)

OTHER PUBLICATIONS

Office Action Oct. 10, 2016, in Chinese Patent Application No. 201310030460.4.

(Continued)

*Primary Examiner* — Michael H Caley
*Assistant Examiner* — Agnes Dobrowolski
(74) *Attorney, Agent, or Firm* — H.C. Park & Associates, PLC

(57) ABSTRACT

A liquid crystal display includes: a first substrate and a pixel electrode thereon, a second substrate facing the first substrate and a common electrode thereon; at least one alignment layer on at least one of the pixel electrode and the common electrode; and a liquid crystal layer between the pixel electrode and the common electrode. A pixel including the pixel electrode includes a plurality of domains including a first domain. The domains have average orientations of the liquid crystal molecules different from each other. The pixel electrode has a first opening in the first domain, and the first opening extends substantially parallel to an edge of the pixel electrode.

14 Claims, 24 Drawing Sheets

(56) References Cited

U.S. PATENT DOCUMENTS

| | | | |
|---|---|---|---|
| 6,342,938 B1* | 1/2002 | Song et al. | 349/143 |
| 7,230,669 B1 | 6/2007 | Tashiro et al. | |
| 7,248,319 B2* | 7/2007 | Liu et al. | 349/129 |
| 7,289,178 B2 | 10/2007 | Sasabayashi et al. | |
| 7,508,385 B2 | 3/2009 | Ueda et al. | |
| 7,564,510 B2 | 7/2009 | Miyachi et al. | |
| 7,580,085 B2 | 8/2009 | Jacobs et al. | |
| 7,723,727 B2* | 5/2010 | Song | G02F 1/134309 |
| | | | 349/142 |
| 7,749,575 B2 | 7/2010 | Kataoka et al. | |
| 7,864,279 B2 | 1/2011 | Sawasaki et al. | |
| 7,868,952 B2 | 1/2011 | Fukushima et al. | |
| 7,872,719 B2 | 1/2011 | Hanaoka et al. | |
| 7,897,003 B2 | 3/2011 | Tashiro | |
| 7,924,382 B2 | 4/2011 | Yagi et al. | |
| 7,995,177 B2 | 8/2011 | Shoraku et al. | |
| 8,049,861 B2 | 11/2011 | Miyachi | |
| 8,057,868 B2 | 11/2011 | Terashita et al. | |
| 8,059,256 B2 | 11/2011 | Miyachi | |
| 8,305,534 B2* | 11/2012 | Jung et al. | 349/129 |
| 8,345,196 B2* | 1/2013 | Lee et al. | 349/126 |
| 8,564,751 B2* | 10/2013 | Nakanishi et al. | 349/129 |
| 2003/0086044 A1 | 5/2003 | Inoue et al. | |
| 2004/0004690 A1* | 1/2004 | Yamaguchi | G02F 1/133707 |
| | | | 349/141 |
| 2004/0188643 A1 | 9/2004 | Weiss et al. | |
| 2005/0200789 A1 | 9/2005 | Nakanishi | |
| 2006/0012741 A1* | 1/2006 | Mizusako | G02F 1/133707 |
| | | | 349/130 |
| 2006/0071927 A1* | 4/2006 | Chang | G02F 1/133707 |
| | | | 345/211 |
| 2006/0139541 A1* | 6/2006 | Yamaguchi | G02F 1/133707 |
| | | | 349/130 |
| 2007/0064187 A1 | 3/2007 | Takeda et al. | |
| 2007/0200990 A1 | 8/2007 | Hirosawa et al. | |
| 2008/0111963 A1 | 5/2008 | Wu et al. | |
| 2009/0244462 A1 | 10/2009 | Tsubata | |
| 2009/0279034 A1 | 11/2009 | Shoraku et al. | |
| 2010/0208163 A1 | 8/2010 | Fuchikami et al. | |
| 2011/0037686 A1 | 2/2011 | Inoue et al. | |
| 2011/0134380 A1 | 6/2011 | Inoue et al. | |
| 2011/0149209 A1 | 6/2011 | Miyachi | |
| 2011/0149210 A1 | 6/2011 | Miyachi | |
| 2011/0181823 A1 | 7/2011 | Hakoi et al. | |
| 2011/0261307 A1 | 10/2011 | Shin et al. | |
| 2012/0033158 A1* | 2/2012 | Nakanishi et al. | 349/96 |
| 2012/0154727 A1* | 6/2012 | Chang et al. | 349/129 |
| 2012/0281173 A1 | 11/2012 | Kwon et al. | |
| 2013/0293815 A1* | 11/2013 | Shibazaki et al. | 349/129 |

FOREIGN PATENT DOCUMENTS

| | | |
|---|---|---|
| CN | 102998854 | 3/2013 |
| JP | H11-109405 | 4/1999 |
| JP | H1109405 | 4/1999 |
| JP | 2003-029283 | 1/2003 |
| JP | 2005258194 | 9/2005 |
| JP | 2005283691 | 10/2005 |
| JP | 2008-225290 | 9/2008 |
| JP | 2009163277 | 7/2009 |
| JP | 2011227505 | 11/2011 |
| JP | 2012078875 | 4/2012 |
| KR | 1019980057609 | 9/1998 |
| KR | 100341121 | 6/2002 |
| KR | 100358872 | 10/2002 |
| KR | 1020030044869 | 6/2003 |
| KR | 1020050092851 | 9/2005 |
| KR | 100832770 | 5/2008 |
| KR | 10-2010-0018479 | 2/2010 |
| WO | 2008007583 | 1/2008 |
| WO | 2012099047 | 7/2012 |

OTHER PUBLICATIONS

Office Action dated Sep. 20, 2016, in Japanese Patent Application No. 2012-249436.

Office Action dated Apr. 6, 2018, in Korean Patent Application No. 10-2012-0041144.

* cited by examiner

LIQUID CRYSTAL DISPLAY

This application claims priority from and the benefit of Korean Patent Application No. 10-2012-0041144, filed on Apr. 19, 2012, which is incorporated herein by reference for all purposes as if fully set forth herein.

BACKGROUND OF THE INVENTION

Field of the Invention

Exemplary embodiments of the present invention relate to a liquid crystal display.

Discussion of the Background

A liquid crystal display (LCD) is one of the most widely used flat panel displays, and includes a pair of panels including a plurality of field generating electrodes such as pixel electrodes and a common electrode and a liquid crystal layer filled in a gap between the two panels.

An electric field is generated by applying electric voltages to the field generating electrodes, and the electric field changes orientations of liquid crystal molecules in the liquid crystal layer, thereby controlling polarization of incident light to display images.

Among the LCDs, a vertically aligned (VA) mode where long axes of the liquid crystal molecules are perpendicular to surfaces of the panels in the absence of electric field is promising since the vertically aligned mode provides high contrast ratio and wide viewing angle.

A pixel of a VA mode LCD may include a plurality of domains, wherein average orientations of the liquid crystal molecules in different domains being different from each other in order to obtain a wide viewing angle. In order to form multiple domains, a plurality of cutouts may be provided in the field generating electrodes. However, such a structure may cause the decrease of the opening ratio, and the liquid crystal molecules far from the cutouts may have a large response time.

Another method of forming multiple domains in a pixel is to illuminate light to an alignment layer to control orientations of the liquid crystal molecules. The light-induced alignment may require no cutout in the field generating electrodes, thereby increasing the opening ratio, and may provide pretilt, thereby improving the response time. However, the light-induced alignment may not significantly improve the decrease of the light transmittance due to fringe fields caused by edges of the field generating electrodes.

SUMMARY OF THE INVENTION

An exemplary embodiment of the present invention discloses a liquid crystal display which includes: a first substrate; a second substrate facing the first substrate; a pixel electrode on the first substrate; a common electrode on the second substrate; at least one alignment layer on at least one of the pixel electrode and the common electrode, the at least one alignment layer treated by a polarized light; and a liquid crystal layer between the pixel electrode and the common electrode, the liquid crystal layer including a plurality of liquid crystal molecules, wherein a pixel including the pixel electrode includes a plurality of domains including a first domain, the plurality of domains have average orientations of the liquid crystal molecules different from each other, the pixel electrode includes a first opening in the first domain, and the first opening extends substantially parallel to a tail-side edge portion of an edge of the pixel electrode disposed close to a tail of an average director of the first domain.

Another exemplary embodiment of the present invention discloses a liquid crystal display which includes: a first substrate; a second substrate facing the first substrate; a pixel electrode on the first substrate; a common electrode on the second substrate; and a liquid crystal layer between the pixel electrode and the common electrode, the liquid crystal layer including a plurality of liquid crystal molecules, wherein a pixel including the pixel electrode is divided into a plurality of domains, and the plurality of domains have average orientations of the liquid crystal molecules different from each other, a portion of the pixel electrode in at least one of the plurality of domains includes an opening extending along a tail-side edge portion of an edge of the pixel electrode disposed close to a tail of an average director of the at least one of the plurality of domains, the pixel electrode has a continuous surface except for the opening, and the common electrode has a continuous surface.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Figure 1:
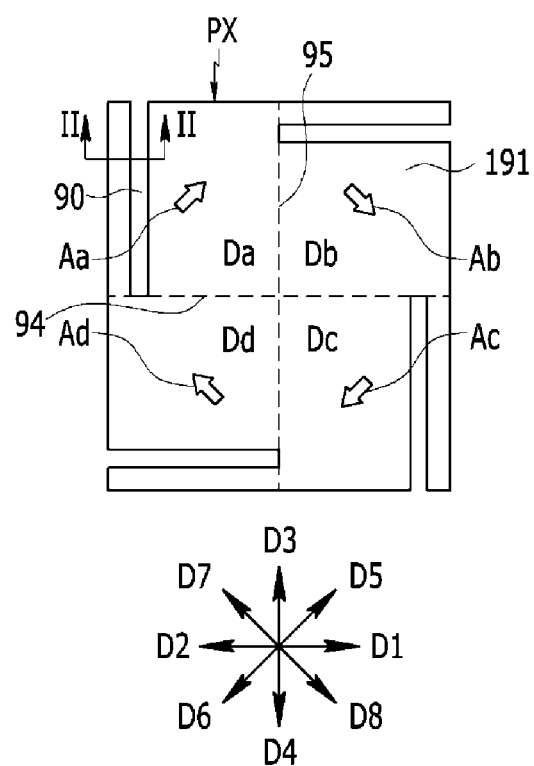
FIG. 1 is a schematic plan view of a pixel of a liquid crystal display according to an exemplary embodiment of the invention.

The present invention will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In the drawings, the thickness of layers, films, panels, regions, etc., may be exaggerated for clarity. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. In contrast, it will be understood that when an element such as a layer, film, region, or substrate is referred to as being "beneath" another element, it can be directly beneath the other element or intervening elements may also be present. Meanwhile, when an element is referred to as being "directly beneath" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, a structure of a pixel of a liquid crystal display according to exemplary embodiments will be described in detail with reference to FIG. 1 and FIG. 2.

Figure 2:
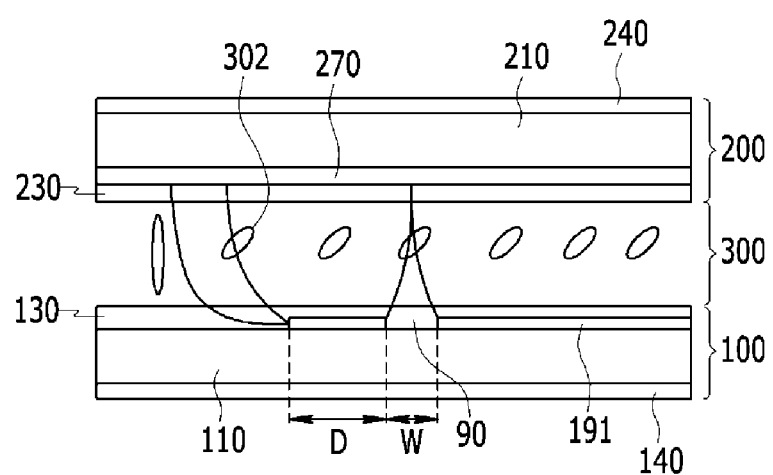
FIG. 2 is a schematic sectional view of the liquid crystal display shown in FIG. 1 taken along line II-II.

FIG. 1 is a schematic plan view of a pixel of a liquid crystal display according to an exemplary embodiment of the invention, and FIG. 2 is a schematic sectional view of the liquid crystal display shown in FIG. 1 taken along line II-II. Although FIG. 1 and FIG. 2 show a single pixel PX, a liquid crystal display according to an exemplary embodiment may include a plurality of pixels repeatedly arranged in rows and columns.

Referring to FIG. 1 and FIG. 2, a liquid crystal display (LCD) according to exemplary embodiments includes a first panel 100, a second panel 200 facing the first panel 100, and a liquid crystal layer 300 disposed between the first panel 100 and the second panel 200. The first panel 100 includes a first substrate 110, a pixel electrode 191 disposed on an inner surface of the first substrate 110, a first alignment layer 130 disposed on the pixel electrode 191, and a first polarizer 140 disposed on an outer surface of the first substrate 110. The second panel 200 includes a second substrate 210, a common electrode 270 disposed on an inner surface of the second substrate 210, a second alignment layer 230 disposed on the common electrode 210, and a second polarizer 240 disposed on an outer surface of the second substrate 210. The pixel electrode 191 may be substantially rectangular, and the common electrode 210 may cover an entire surface of the second panel 200, but embodiments are not limited thereto. The first panel 100 and the second panel 200 may include switching elements (not shown), color filters (not shown), light blocking members (not shown), etc., and one of the first polarizer 140 and the second polarizer 240 may be omitted.

The liquid crystal layer 300 may include a nematic liquid crystal material having negative dielectric anisotropy. Liquid crystal molecules 302 included in the liquid crystal layer 300 may be oriented such that long axes of the liquid crystal molecules 302 are aligned substantially parallel to a direction normal to surfaces of the alignment layers 130 and 230 (or to a thickness direction of the liquid crystal layer 300) with a pretilt, in the absence of electric field between the electrodes 191 and 210. When a potential difference is given between the pixel electrode 191 and the common electrode 210 to generate an electric field across the liquid crystal layer 300, the liquid crystal molecules 302 may be oriented such that their long axes are aligned substantially perpendicular to the electric field in a direction largely determined by a direction of the pretilt.

According to an exemplary embodiment of the present invention, a pixel PX may include a region of the LCD corresponding to the pixel electrode 191, and the pixel PX may include a plurality of domains having different pretilt directions. For example, referring to FIG. 1, the pixel PX may include four domains, first to fourth domains Da, Db, Dc and Dd divided by a transverse center line 94 and a longitudinal center line 95. Most of the liquid crystal molecules 302 in each of the domains Da, Db, Dc and Dd may be oriented to have a pretilt in a direction denoted by an arrow Aa, Ab, Ac or Ad in a top view or a plan view. A tail of the arrow Aa, Ab, Ac or Ad may denote one of two opposite ends of a liquid crystal molecule 302, which is closer to a surface of the pixel electrode 191, and a head of the arrow Aa, Ab, Ac or Ad may denote the other end of the liquid crystal molecule 302, which is closer to the common electrode 210. Hereinafter, the end of the liquid crystal molecule 302 closer to the surface of the pixel electrode 191 is referred to as a tail of the liquid crystal molecule 302, and the other end of the liquid crystal molecule 302 closer to the common electrode 210 is referred to as a head of the liquid crystal molecule 302. However, the head and tail of the arrow Aa, Ab, Ac or Ad may be defined in a reverse manner, and thus the heads and tails of the arrows Aa, Ab, Ac and Ad shown in FIG. 1 may be reversed.

When an average liquid crystal molecule is assumed to have an orientation that is substantially the same as the average of the orientations of the liquid crystal molecules 302 in a domain Da, Db, Dc or Dd, the average liquid crystal molecule may tilt in the pretilt direction of the domain Da, Db, Dc or Dd under an electric field. Therefore, the arrow Aa, Ab, Ac or Ad may denote the orientation of the average liquid crystal molecule or the average of the orientations of the liquid crystal molecules 302. The orientation of the average liquid crystal molecule in the domain Da, Db, Dc or Dd is referred to as "average director" in the specification. The average director may coincide with the pretilt direction.

In FIG. 1 and following figures, a rightward direction and a leftward direction among transverse directions on a horizontal plane, that is, a plane substantially parallel to the surfaces of the substrates 110 and 210 are referred to as a first direction D1 and a second direction D2, respectively. An upward direction and a downward direction among longitudinal directions on the horizontal plane are referred to as a third direction D3 and a fourth direction D4, respectively. An upper rightward direction and a lower leftward direction on the horizontal plane are referred to as a firth direction D5 and a sixth direction D6, respectively, and an upper leftward direction and a lower rightward direction on the horizontal plane are referred to as a seventh direction D7 and a eighth direction D8, respectively. The fifth to eighth directions D5, D6, D7 and D8 may make an angle of about 45 degrees with the first to fourth directions D1, D2, D3 and D4, respectively.

The polarizer 140 or 240 may have a polarization axis substantially parallel to a transverse direction, that is, the first direction or the second direction, or to a longitudinal direction, that is, the third direction or the fourth direction. The polarization axes of the first polarizer 140 and the second polarizer 240 may make substantially a right angle.

The first domain Da is disposed in an upper left quadrant of the pixel electrode 191 divided by the transverse center line 94 and the longitudinal center line 95. The liquid crystal molecules 302 in the first domain Da may be oriented to have a pretilt in the fifth direction D5, and thus the liquid crystal molecules 302 may tilt in the fifth direction D5 on average when an electric field is generated between the electrodes 191 and 210.

The second domain Db is disposed in an upper right quadrant of the pixel electrode 191. The liquid crystal molecules 302 in the second domain Db may be oriented to have a pretilt in the eighth direction D8, and thus the liquid crystal molecules 302 may tilt in the eighth direction D8 on average when an electric field is generated between the electrodes 191 and 210.

The third domain Dc is disposed in a lower right quadrant of the pixel electrode 191. The liquid crystal molecules 302 in the third domain Dc may be oriented to have a pretilt in the sixth direction D6, and thus the liquid crystal molecules 302 may tilt in the sixth direction D6 on average when an electric field is generated between the electrodes 191 and 210.

The fourth domain Dd is disposed in a lower left quadrant of the pixel electrode 191. The liquid crystal molecules 302 in the fourth domain Dd may be oriented to have a pretilt in the seventh direction D7, and thus the liquid crystal molecules 302 may tilt in the seventh direction D7 on average when an electric field is generated between the electrodes 191 and 210.

Therefore, in a plan view, the average directors of adjacent domains Da, Db, Dc and Dd may make an angle of about 90 degrees. When sequential head-to-tail connection of the average directors from the first domain Da to the fourth domain Dd is drawn, for example, the head of the average director of the n-th domain (n=1, 2 and 3) Da, Db or Dc is connected to the tail of the average director of the (n+1)-th domain Db, Dc or Dd, and the head of the average director of the fourth domain Dd is connected to the tail of the average director of the first domain Da, a clockwise loop may be obtained According to an exemplary embodiment, a portion of the pixel electrode 191 in each domain Da, Db, Dc or Dd has an opening or a cutout 90. Referring to FIG. 1, when the average director Aa, Ab, Ac or Ad of the domain Da, Db, Dc or Dd is shown in the domain Da, Db, Dc or Dd, the cutout 90 may extend along a portion of an edge disposed close to the tail of the average director Aa, Ab, Ac or Ad of the corresponding domain Da, Db, Dc or Dd, and the cutout 90 may be substantially parallel to the edge portion. In other words, the cutout 90 may extend substantially parallel to a portion of an edge of the pixel electrode 191 disposed away from the average orientation of the liquid crystal molecules 302. The cutout 90 may be spaced apart from the edge portion of the pixel electrode 191 substantially parallel thereto by a distance D, and the cutout 90 may extend substantially from a portion of an edge of the pixel electrode 191 disposed close to the head of the average director Aa, Ab, Ac or Ad substantially to the transverse center line 94 or the longitudinal center line 95 of the pixel electrode 191.

For example, in case of the first domain Da, an upper half of a left edge and a left half of an upper edge of the pixel electrode 191 may form boundaries of the first domain Da. Since the average orientation of the liquid crystal molecules 302 in the first domain Da points in the upper rightward direction, the upper half of the left edge of the pixel electrode 191 is disposed away from the average orientation of the liquid crystal molecules 302, and the left half of the upper edge of the pixel electrode 191 is disposed close to the average orientation of the liquid crystal molecules 302. In other words, the upper half of the left edge of the pixel electrode 191 is disposed close to the tail of the average director, and the left half of the upper edge of the pixel electrode 191 is disposed close to the head of the average director. Therefore, the cutout 90 of the first domain Da may extend substantially parallel to the upper half of the left edge of the pixel electrode 191. Hereinafter, a portion of the pixel electrode 191 disposed close to the tail of the average director Aa, Ab, Ac or Ad, or disposed away from the average orientation of the liquid crystal molecules 302 is referred to as "a tail-side edge portion," and a portion of the pixel electrode 191 disposed close to the head of the average director Aa, Ab, Ac or Ad, or disposed close from the average orientation of the liquid crystal molecules 302 is referred to as "a head-side edge portion."

Although FIG. 1 shows that the opening or the cutout 90 is open to communicate with a boundary of the pixel electrode 191, the opening or the cutout 90 may be closed to be surrounded by the pixel electrode 191.

The orientations of the liquid crystal molecules 302 may be obtained by treating the alignment layers 130 and 230. One of the alignment layers 130 and 230 may be omitted.

A method of treating alignment layers so that the liquid crystal molecules 302 may be oriented as shown in FIG. 1 according to exemplary embodiments is described in detail with reference to FIG. 3, FIG. 4, FIG. 5, and FIG. 6.

FIG. 3, FIG. 4, FIG. 5, and FIG. 6 are schematic plan views showing a method of manufacturing an LCD shown in FIG. 1 according to an exemplary embodiment.

According to an exemplary embodiment, the alignment layers may include a photosensitive polymer.

According to an exemplary embodiment, photosensitive polymer layers are formed on the first substrate 110 and the second substrate 210, and are exposed to polarized ultraviolet (UV) light to form the alignment layers 130 and 230. It may be assumed that the molecules in the photosensitive polymer layers are aligned in an illumination direction of the polarized UV light. According to another exemplary embodiment, it may be assumed that the molecules in the photosensitive polymer layers are aligned in an opposite direction to an illumination direction of the polarized UV light. According to another exemplary embodiment, another type of light or an ion beam may be used rather than the UV light.

Hereinafter, a process of UV illumination will be described in detail.

Figure 3:
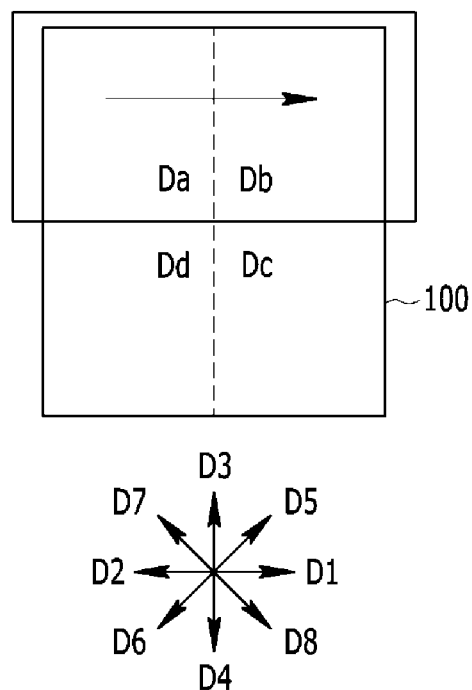
FIG. 3, FIG. 4, FIG. 5, and FIG. 6 are schematic plan views showing a method of manufacturing an LCD shown in FIG. 1 according to an exemplary embodiment of the invention.

First, referring to FIG. 3, a first light-induced orientation is performed in a direction on an area of the first panel 100. For example, the first light-induced orientation may be performed in the first direction D1 on an area of the first alignment layer 130 corresponding to the first domain Da and the second domain Db.

Figure 4:
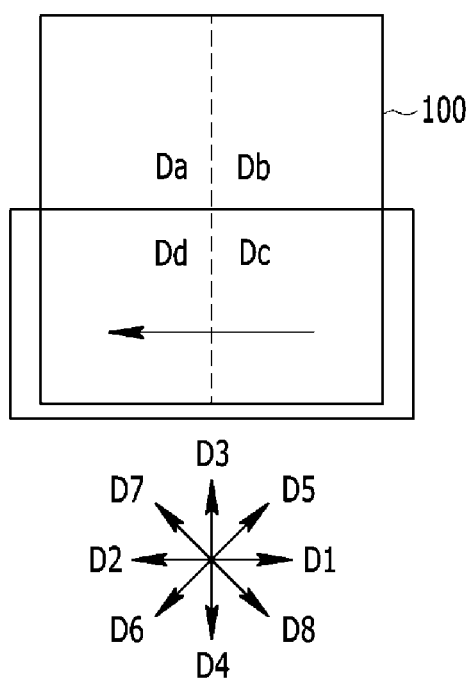

Next, referring to FIG. 4, a second light-induced orientation is performed in another direction on another area of the first panel 100. The direction of the second light-induced orientation may be the opposite to the direction of the first light-induced orientation. For example, the second light-induced orientation may be performed in the second direction D2 on an area of the first alignment layer 130 corresponding to the third domain Dc and the fourth domain Dd.

Figure 5:
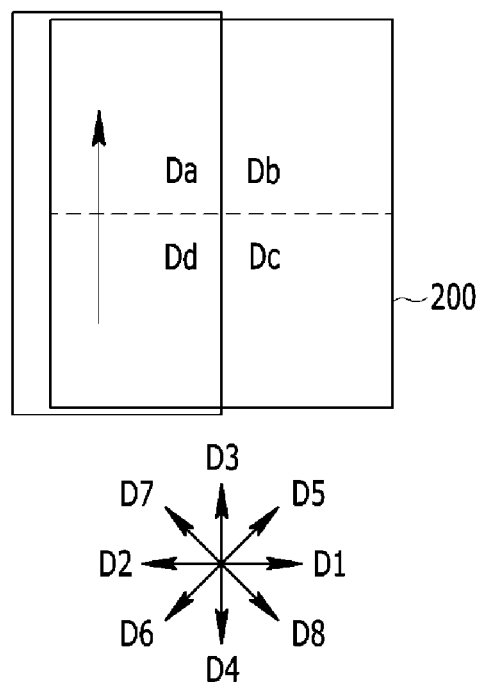

Referring to FIG. 5, a third light-induced orientation is performed in a direction on an area of the second panel 200. The area of the second panel 200 treated by the third light-induced orientation may overlap portions of the areas of the first panel 100 treated by the first and second light-induced orientations, and the direction in the third light-induced orientation may make an angle of about 90 degrees with the directions in the first and second light-induced orientations. For example, the third light-induced orientation may be performed in the third direction D3 on an area of the second alignment layer 230 corresponding to the first domain Da and the fourth domain Dd.

Figure 6:
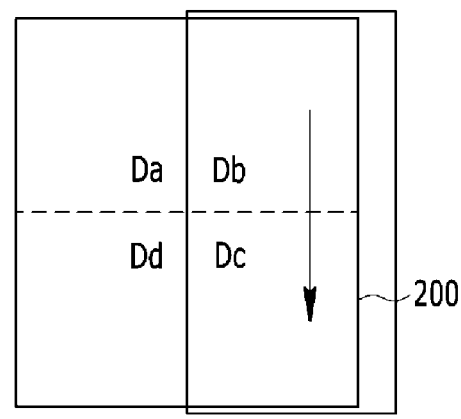
Figure 6:
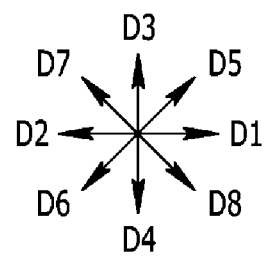

Next, referring to FIG. 6, a fourth light-induced orientation is performed in another direction on another area of the second panel 200. The area of the second panel 200 treated by the fourth light-induced orientation may overlap other portions of the areas of the first panel 100 treated by the first and second light-induced orientations, and the direction of the fourth light-induced orientation may be the opposite to the direction of the third light-induced orientation. For example, the fourth light-induced orientation may be performed in the fourth direction D4 on an area of the second alignment layer 230 corresponding to the second domain Db and the third domain Dc.

As a result, the liquid crystal molecules 302 disposed between the first panel 100 and the second panel 200 may have pretilt by the alignment layers 130 and 230. The direction of the pretilt may be substantially parallel to a vector sum of the alignment directions of the first alignment layer 130 and the second alignment layer 230.

For example, the liquid crystal molecules 302 in the first domain Da may have a pretilt in the fifth direction D5 substantially parallel to a vector sum of the first direction D1 and the third direction D3, since the first alignment layer 130 is aligned in the first direction D1 and the second alignment layer 230 is aligned in the third direction D3. The liquid crystal molecules 302 in the second domain Db may have a pretilt in the eighth direction D8 substantially parallel to a vector sum of the first direction D1 and the fourth direction D4, since the first alignment layer 130 is aligned in the first direction D1 and the second alignment layer 230 is aligned in the fourth direction D4. The liquid crystal molecules 302 in the third domain Dc may have a pretilt in the sixth direction D6 substantially parallel to a vector sum of the second direction D2 and the fourth direction D4, since the first alignment layer 130 is aligned in the second direction D2 and the second alignment layer 230 is aligned in the fourth direction D4. The liquid crystal molecules 302 in the fourth domain Dd may have a pretilt in the seventh direction D7 substantially parallel to a vector sum of the second direction D2 and the third direction D3, since the first alignment layer 130 is aligned in the second direction D2 and the second alignment layer 230 is aligned in the third direction D3.

Therefore, the orientations of the liquid crystal molecules 302 may circulate clockwise as shown in FIG. 1.

Next, LCDs according to an exemplary embodiment and a comparative example will be described in detail with reference to FIG. 7 and FIG. 8.

Figure 7:
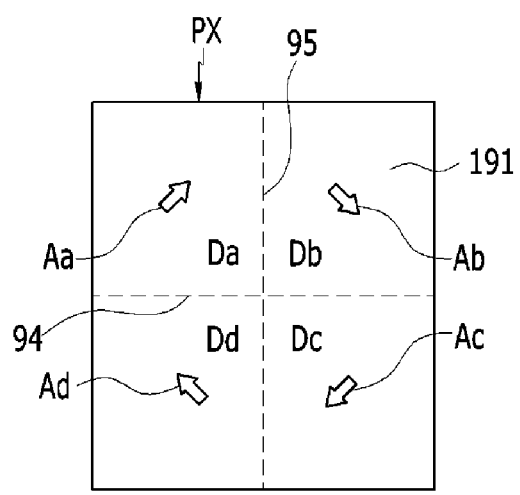
FIG. 7 is a schematic plan view of a pixel of an LCD according to a comparative example.
Figure 8:
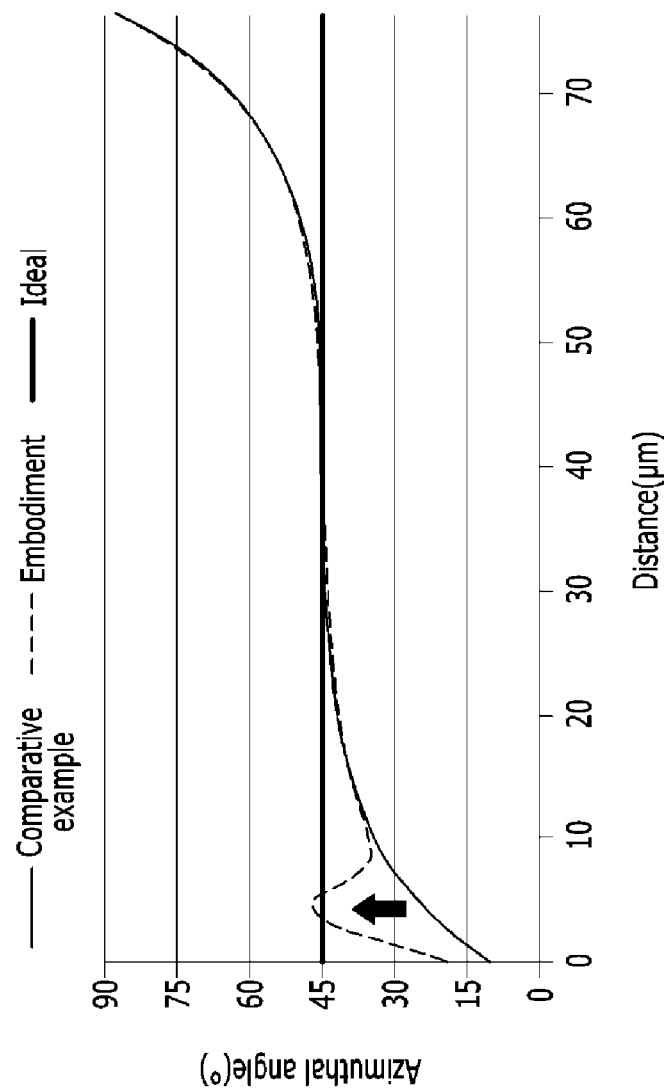
FIG. 8 is a graph showing azimuthal distributions of liquid crystal molecules of LCDs according to an exemplary embodiment and a comparative example.

FIG. 7 is a schematic plan view of a pixel of an LCD according to a comparative example, and FIG. 8 is a graph showing azimuthal distributions of liquid crystal molecules of LCDs according to an exemplary embodiment and a comparative example.

Referring to FIG. 7, a pixel PX of an LCD according to a comparative example includes a pixel electrode 191. The pixel electrode 191 shown in FIG. 7 has no opening while the pixel electrode 191 shown in FIG. 1 has the cutouts 90. Except for the opening, the pixel PX shown in FIG. 7 may be substantially the same as the pixel PX shown in FIG. 1. Detailed description of same elements will be omitted.

FIG. 8 is simulated azimuthal distributions of the liquid crystal molecules 302 as function of a distance from a tail-side edge portion of the pixel electrode 191 in the first domains Da of the exemplary embodiment shown in FIG. 1 and the comparative example shown in FIG. 7 when a potential difference is given between the pixel electrode 191 and the common electrode 210 to generate an electric field in the liquid crystal layer 300. The azimuthal angles of the liquid crystal molecules 302 mean angles that the long axes of the liquid crystal molecules 302 make with the transverse center line 94.

Since the polarization angles of the polarizers 140 and 240 are substantially parallel to a transverse direction or a longitudinal direction, the first domain Da may have a maximum transmittance when the azimuthal angles of all the liquid crystal molecules 302 is about 45 degrees, ideally.

Referring to FIG. 8, in the comparative example, the liquid crystal molecules 302 in a central region of the first domain Da may have an azimuthal angle of about 45 degrees, and the azimuthal angle deviates from 45 degrees as it approaches a boundary of the domain. In particular, the azimuthal angle approaches zero as it becomes closer to the tail-side edge portion of the pixel electrode 191. This indicates that the liquid crystal molecules 302 are aligned in a direction substantially perpendicular to the tail-side edge portion of the pixel electrode 191. However, in the exemplary embodiment, the azimuthal angle of the liquid crystal molecules 302 adjacent to the tail-side edge portion of the pixel electrode 191 is also close to about 45 degrees.

Explanation about the simulation result shown in FIG. 8 will be given in detail with reference to FIG. 9, FIG. 10, and FIG. 11.

Figure 9:
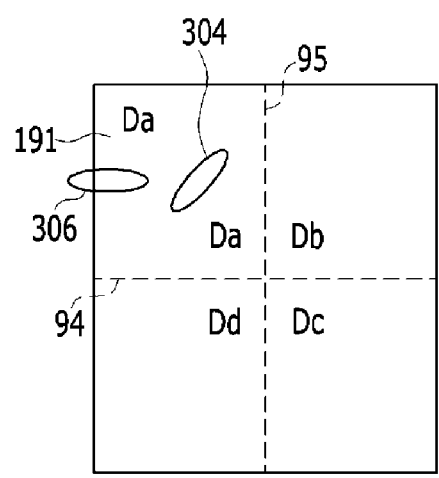
FIG. 9 and FIG. 10 are plan views schematically showing arrangements of liquid crystal molecules in the first domain of the LCD according to an exemplary embodiment and a comparative example, respectively.
Figure 10:
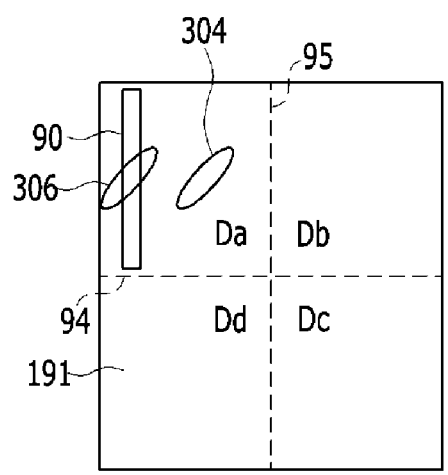
Figure 11:
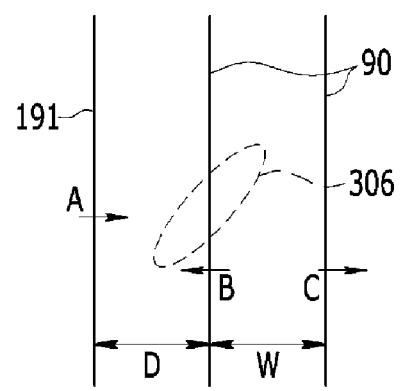
FIG. 11 is a plan view schematically showing electric fields and an arrangement of the liquid crystal molecules near a boundary of the first domain of the LCD according to an exemplary embodiment.

FIG. 9 and FIG. 10 are plan views schematically showing arrangements of liquid crystal molecules in the first domain of the LCD according to an exemplary embodiment and a comparative example, respectively, and FIG. 11 is a plan view schematically showing electric fields and an arrangement of the liquid crystal molecules near a boundary of the first domain of the LCD according to an exemplary embodiment.

FIG. 9 schematically shows an arrangement of liquid crystal molecules 304 and 306 in the first domain Da according to a comparative example. A liquid crystal molecule 304 near a center region of the first domain Da may be oriented such that its long axis is substantially parallel to the average director Aa of the first domain Da shown in FIG. 1. However, a fringe field is generated in a region near the tail-side edge portion of the pixel electrode 191 (referred to as "an edge region" hereinafter) due to the edge of the pixel electrode 191. A horizontal component of the fringe field may be substantially perpendicular to the edge of the pixel electrode 191. In the edge region, an orientation of a liquid crystal molecule 306 may not be parallel to the average director Aa of the first domain Da shown in FIG. 7 since a force caused by the horizontal field component is greater than an aligning force caused by the alignment layers 130 and 230. That is, the long axis of the liquid crystal molecule 304 may make an angle of about 45 degrees with the transverse center line 94 in the center region, while the long axis of the liquid crystal molecule 306 may be substantially parallel to the transverse center line 94 in the edge region. In this way, an angle that the long axis of the liquid crystal molecule 306 makes with the polarization axis of the polarizer 140 or 240 shown in FIG. 1, the polarization axis being substantially parallel to the transverse center line 94 or the longitudinal center line 95, deviates from 45 degrees in the edge region, and thus light transmittance may be decreased.

FIG. 10 schematically shows an arrangement of liquid crystal molecules 304 and 306 in the first domain Da according to an exemplary embodiment. Unlike the comparative example, the long axis of the liquid crystal molecules 306 may make an angle of about 45 degrees with the transverse center line 94 even in the edge region.

Referring to FIG. 11, a reference character A denotes a first horizontal field component caused by an edge of the pixel electrode 191. In this exemplary embodiment, the cutout 90 may cause a second horizontal field component B and a third horizontal field component C. In the edge region, the second horizontal field component B caused by an edge of the cutout 90 adjacent to the edge of the pixel electrode 191 may be significant. The second horizontal field component B may be generated by a left boundary of the cutout 90, and may point toward the edge of the pixel electrode 191, that is, may be reverse-parallel to the first horizontal field component A.

In the edge region, the strength of the second horizontal field component B may vary depending on the distance D between the tail-side edge portion of the pixel electrode 191 and the cutout 90 and the width W of the cutout 90. When the second horizontal field component B is smaller than the first horizontal field component A, a net horizontal field component in the edge region may have a direction substantially parallel to the first horizontal field component A, and may have a magnitude smaller than the first horizontal field component A.

Therefore, since the horizontal field component in the exemplary embodiment is smaller than that in the comparative example in the edge region, the liquid crystal molecule 306 may be oriented relatively closer to the average orientation of the liquid crystal molecules 302 in the first domain Da, that is, closer to the average director Aa of the first domain Da. Accordingly, the decrease in the transmittance in the edge region due to the irregular orientations of the liquid crystal molecules may be reduced. The simulation shown in FIG. 8 shows that the transmittance in the exemplary embodiment increases by about 2% compared with the comparative example.

Figure 12:
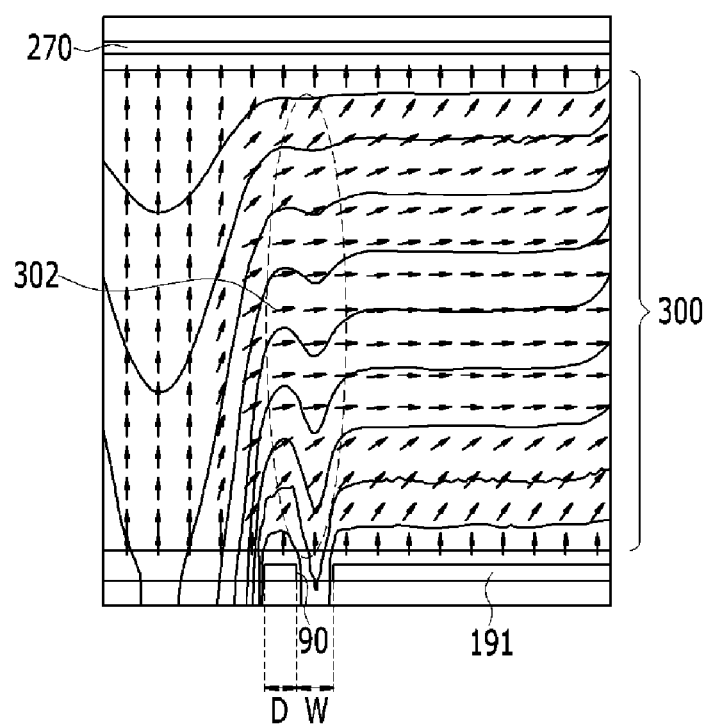
FIG. 12 and FIG. 13 are schematic sectional views of the LCD showing equipotential lines and arrangements of liquid crystal molecules in a domain of an LCD in a simulation.
Figure 13:
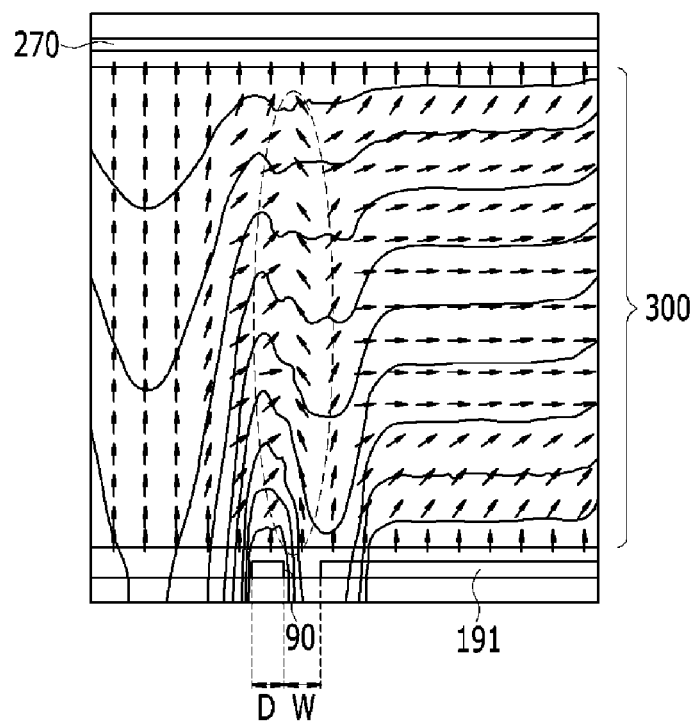

FIG. 12 and FIG. 13 are schematic sectional views of the LCD showing equipotential lines and arrangements of liquid crystal molecules in a domain of an LCD in a simulation.

In the simulation, the material property of the liquid crystal layer 300 was set to be substantially the same as MAT-08-369 (manufactured by MERK), and the thickness of the liquid crystal layer 300 was about 3.2 µm.

FIG. 12 shows the arrangement of the liquid crystal molecules 302 when both the distance D between the tail-side edge portion of the pixel electrode 191 and the cutout 90 and the width W of the cutout 90 are all about 3 µm. It may be seen that the liquid crystal molecules 302 in the edge region are oriented close to the average orientation of the liquid crystal molecules 302 in the domain.

FIG. 13 shows the arrangement of the liquid crystal molecules 302 when the distance D between the tail-side edge portion of the pixel electrode 191 is about 3 µm, and the width W of the cutout 90 is about 7 µm. Some of the liquid crystal molecules 302 in the edge region are oriented approximately the opposite to the average orientation of the liquid crystal molecules 302 in the domain.

Table 1 summarizes a result of a simulation that tests whether the orientations of the liquid crystal molecules 302 in the edge region are the opposite or not as the distance D between the tail-side edge portion of the pixel electrode 191 and the width W of the cutout 90 vary.

TABLE 1

| | | D (µm) | | | | | | |
|---|---|---|---|---|---|---|---|---|
| | | 2 | 3 | 4 | 5 | 6 | 7 | 8 |
| W (µm) | 3 | Y | Y | Y | Y | Y | U | N |
| | 4 | Y | Y | Y | U | N | N | N |
| | 5 | Y | Y | N | N | N | N | N |
| | 6 | Y | U | N | N | N | N | N |
| | 7 | Y | N | N | N | N | N | N |
| | 8 | N | N | N | N | N | N | N |

The simulation condition of the liquid crystal layer 300 was substantially the same as the condition described with reference to FIG. 12 and FIG. 13. That is, the material property of the liquid crystal layer 300 was set to be substantially the same as MAT-08-369 (manufactured by MERK), and the thickness of the liquid crystal layer 300 was about 3.2 µm.

In Table 1, 'Y' denotes that the liquid crystal molecules 302 in the edge region were oriented close to the average orientation of the liquid crystal molecules 302 in the domain, and 'N' denotes that at least some of the liquid crystal molecules 302 in the edge region were oriented approximately the opposite to the average orientation. 'U' denotes an unstable state where the orientations of the liquid crystal molecules 302 varied depending on the magnitude of the applied voltage.

Referring to Table 1, the liquid crystal molecules 302 in the edge region may be oriented close to the average orientation of the liquid crystal molecules 302 in the domain when the distance D is in a range from about 2 µm to about 6 µm. In addition, the liquid crystal molecules 302 in the edge region may be oriented close to the average orientation of the liquid crystal molecules 302 in the domain when the opening width W is in a range from about 3 µm to about 7 µm. The liquid crystal molecules 302 in the edge region may be oriented not to be the opposite when the distance D or the width W is equal to or smaller than about twice the thickness of the liquid crystal layer 300.

Although the orientations of the liquid crystal molecules 302 in the first domain Da are described above with reference to FIG. 8, FIG. 9, FIG. 10, FIG. 11, FIG. 12, and FIG. 13, the description may be applied in a similar way to other domains Db, Dc and Dd.

Hereinafter, an LCD according to another exemplary embodiment will be described in detail with reference to FIG. 14, FIG. 15, and FIG. 16.

Figure 14:
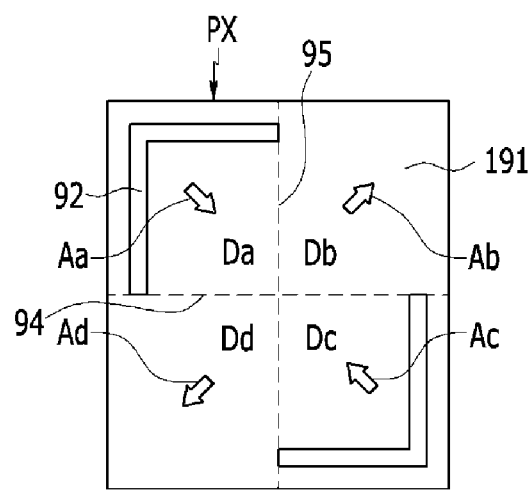
FIG. 14 is a schematic plan view of a pixel of a liquid crystal display according to another exemplary embodiment.
Figure 14:
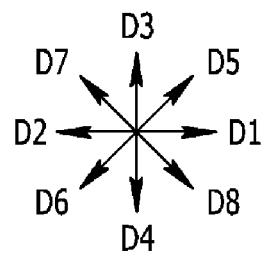
Figure 15:
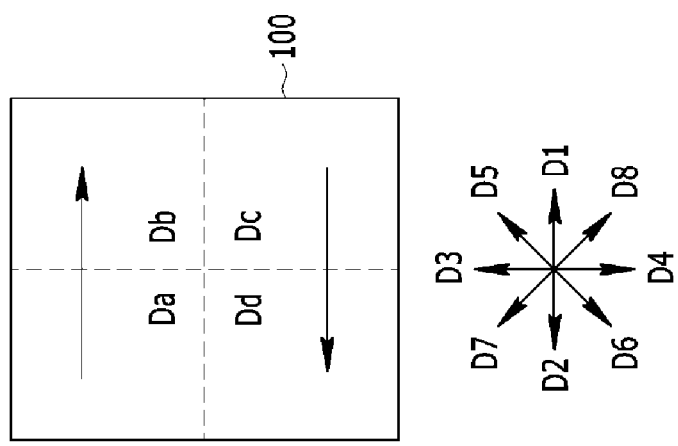
FIG. 15 and FIG. 16 are schematic plan views showing a method of manufacturing an LCD shown in FIG. 14 according to an exemplary embodiment.
Figure 16:
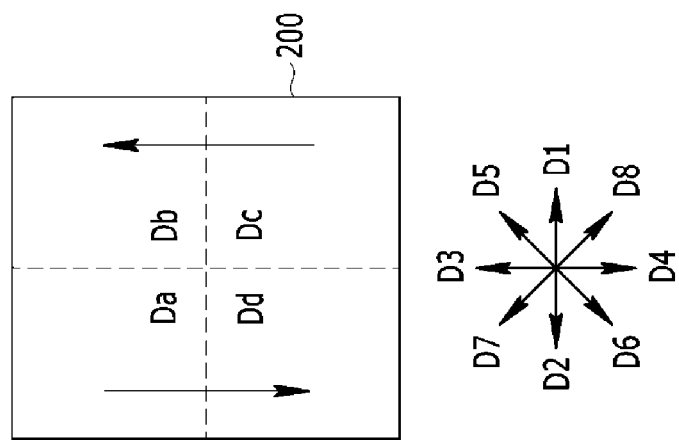

FIG. 14 is a schematic plan view of a pixel of a liquid crystal display according to another exemplary embodiment, and FIG. 15 and FIG. 16 are schematic plan views showing a method of manufacturing the LCD shown in FIG. 14 according to an exemplary embodiment.

Referring to FIG. 14, a pixel PX of a liquid crystal display (LCD) according to another exemplary embodiment may be substantially the same as the pixel PX of the LCD described above with reference to FIG. 1 and FIG. 2, except for pretilt directions, average directors, or average orientations Aa, Ab, Ac and Ad of liquid crystal molecules 302 in domains Da, Db, Dc and Dd, and shapes of openings 92.

The pretilt direction Aa, Ab, Ac or Ad of each of the domains Da, Db, Dc and Dd points from a corner of the pixel electrode 191 to a center of the pixel electrode 191 or from the center of the pixel electrode 191 to a corner of the pixel electrode 191. For example, the average director Aa or Ac of the first or third domain Da or Dc points from a corner of the pixel electrode 191 to the center of the pixel electrode 191, while the average director Ab or Ad of the second or fourth domain Db or Dd points from the center of the pixel electrode 191 to a corner of the pixel electrode 191. Therefore, the average directors Aa, Ab, Ac and Ad of the first to fourth domains Da, Db, Dc and Dd point in the eighth direction D8, the fifth direction D5, the seventh direction D7, and the sixth direction D6, respectively.

Therefore, the heads of the average directors Aa and Ac of the first domain Da and the third domain Dc disposed in a diagonal direction face each other, and the tails of the average directors Ab and Ad of the second domain Db and the fourth domain Dd face each other.

Each of the openings 92 extends substantially parallel to and along a portion of an edge of the pixel electrode 191 disposed close to the tail of the average director Aa or Ac, that is, a tail-side edge portion of the pixel electrode 191. There is no opening in the second and fourth domains Db and Dd since there is no tail-side edge portion in the domains Db and Dd. On the contrary, in each of the first and third domains Da and Dc, two edge portions of the pixel electrode 191, which form boundaries of the domain Da or Dc, are disposed near the tail of the average director Aa or Ac. Therefore, each of the openings 92 in the first and third domains Da and Dc may include two rectilinear portions meeting substantially at a right angle.

For example, the opening 92 in the first domain Da includes two portions that extend along the tail-side edge portions near the tail of the average director Aa from the transverse center line 94 and the longitudinal center line 95 of the pixel electrode 191, respectively, and that have ends thereof meeting near the upper left corner of the pixel electrode 191 to form a shape of '⌐.' The opening 92 in the third domain Dc includes two portions that extend along the tail-side edge portions near the tail of the average director Ac from the transverse center line 94 and the longitudinal center line 95 of the pixel electrode 191, respectively, and that have ends thereof meeting near the lower right corner of the pixel electrode 191 to form a shape of '⌙.'

The transmittance of the pixel PX according to this exemplary embodiment was increased by about 2% relative to the pixel PX without opening as shown in FIG. 7.

A method of light-induced alignment for alignment layers so that the liquid crystal molecules 302 may be oriented as shown in FIG. 14 is described with reference to FIG. 15 and FIG. 16. The method in this exemplary embodiment may be substantially the same as the method described with reference to FIG. 3, FIG. 4, FIG. 5, and FIG. 6 except for the alignment directions of the second panel 200.

Referring to FIG. 15, a first light-induced orientation is performed in the first direction D1 on an area of the first alignment layer 130 corresponding to the first domain Da and the second domain Db. Thereafter, a second light-induced orientation is performed in the second direction D2 on an area of the first alignment layer 130 corresponding to the third domain Dc and the fourth domain Dd.

Referring to FIG. 16, a third light-induced orientation is performed in the fourth direction D4 on an area of the second alignment layer 230 corresponding to the first domain Da and the fourth domain Dd. Thereafter, a fourth light-induced orientation is performed in the third direction D3 on an area of the second alignment layer 230 corresponding to the third domain Dc and the second domain Db.

Hereinafter, an LCD according to another exemplary embodiment will be described in detail with reference to FIG. 17, FIG. 18, and FIG. 19.

Figure 17:
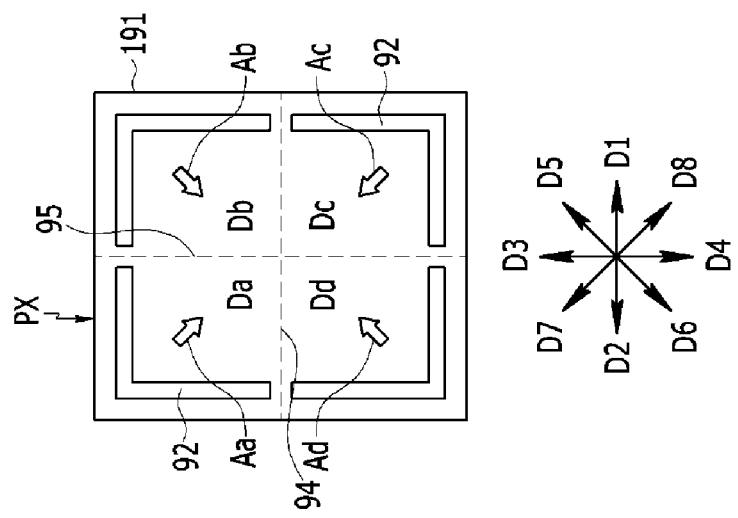
FIG. 17 is a schematic plan view of a pixel of a liquid crystal display according to another exemplary embodiment.
Figure 18:
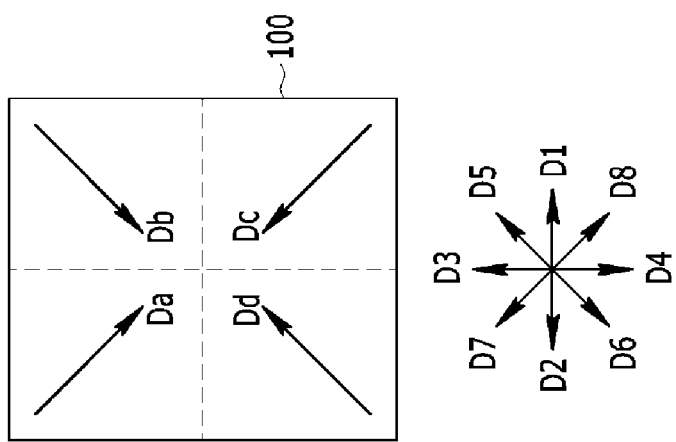
FIG. 18 and FIG. 19 are schematic plan views showing a method of manufacturing an LCD shown in FIG. 17 according to an exemplary embodiment.
Figure 19:
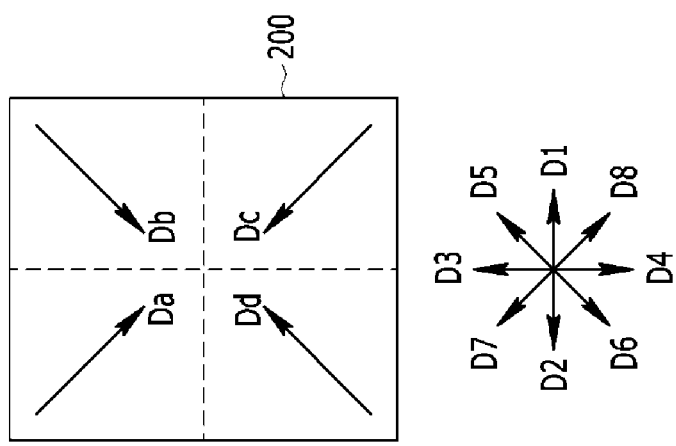

FIG. 17 is a schematic plan view of a pixel of a liquid crystal display according to another exemplary embodiment, and FIG. 18 and FIG. 19 are schematic plan views showing a method of manufacturing an LCD shown in FIG. 17 according to an exemplary embodiment.

Referring to FIG. 18, a pixel PX of a liquid crystal display (LCD) according to another exemplary embodiment may be substantially the same as the pixel PX of the LCD described above with reference to FIG. 14, except for pretilt directions, average directors, or average orientations Ab and Ad of liquid crystal molecules 302 in some domains Db and Dd and positions of openings 92.

The pretilt direction Aa, Ab, Ac or Ad of each of the domains Da, Db, Dc and Dd points from a corner of the pixel electrode 191 to a center of the pixel electrode 191. Therefore, the average directors Aa, Ab, Ac and Ad of the first to fourth domains Da, Db, Dc and Dd point in the eighth direction D8, the sixth direction D6, the seventh direction D7, and the fifth direction D5 respectively.

Therefore, the heads of the average directors Aa, Ab, Ac and Ad of all the domains Da, Db, Dc and Dd point to the center of the pixel electrode 191.

Each of the openings 92 extends substantially parallel to and along a portion of an edge of the pixel electrode 191 disposed close to the tail of the average director Aa, Ab, Ac or Ad, that is, a tail-side edge portion of the pixel electrode 191. Since two edge portions of the pixel electrode 191, which form boundaries of the domain Da, Db, Dc or Dd, are disposed near the tail of the average director Aa, Ab, Ac or Ad in each of the domains Da, Db, Dc and Dd, each domain Da, Db, Dc or Dd has an opening 92. Each of the openings 92 may include two rectilinear portions meeting substantially at a right angle.

For example, the opening 92 extends from the center of the pixel electrode 191 toward the transverse center line 94 or the longitudinal center line 95 along an edge of the pixel electrode 191. However, the opening 92 does not reach the transverse center line 94 and the longitudinal center line 95. The opening 92 in the first domain Da has a shape of '⌐' the opening 92 in the second domain Db has a shape of '⌐,' the opening 92 in the third domain Dc a shape of '⌙,' and the opening 92 in the fourth domain Dd a shape of '⌙.'

The transmittance of the pixel PX according to this exemplary embodiment was increased by about 4% relative to the pixel PX without opening as shown in FIG. 7.

A method of light-induced alignment for alignment layers so that the liquid crystal molecules 302 may be oriented as shown in FIG. 17 will be described with reference to FIG. 18 and FIG. 19. The method in this exemplary embodiment may be substantially the same as the method described with reference to FIG. 3, FIG. 4, FIG. 5, and FIG. 6 except for the alignment directions of the alignment layers 130 and 230.

Referring to FIG. 18, light-induced orientation is performed in the average director Aa, Ab, Ac or Ad on an area of the first alignment layer 130 corresponding to a corresponding domain Da, Db, Dc or Dd. In detail, an area of the first alignment layer 130 in the first domain Da is aligned in the eighth direction D8 with light-induced orientation, and an area of the first alignment layer 130 in the second domain Db is aligned in the sixth direction D6 with light-induced orientation. An area of the first alignment layer 130 in the third domain Dc is aligned in the seventh direction D7 with light-induced orientation, and an area of the first alignment layer 130 in the fourth domain Dd is aligned in the fifth direction D5 with light-induced orientation.

Referring to FIG. 19, the alignment directions for the second alignment layer 230 of the second panel 200 may be substantially the same as those of the first alignment layer 130 as described with reference to FIG. 18.

An LCD according to another exemplary embodiment is described in detail with reference to with reference to FIG. 20, FIG. 21, and FIG. 22.

Figure 20:
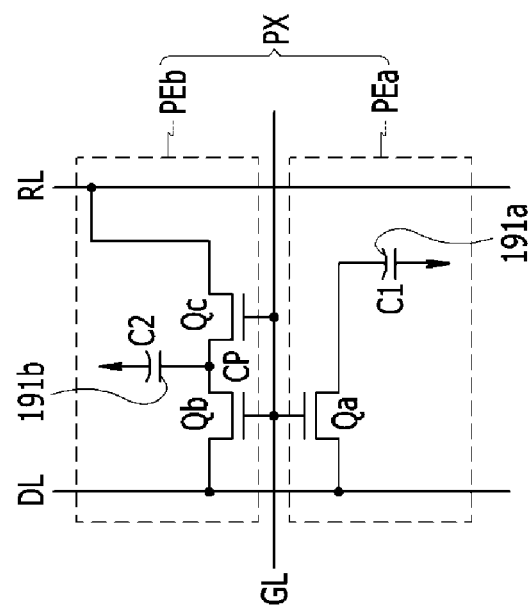
FIG. 20 is an equivalent circuit diagram of a pixel in an LCD according to another exemplary embodiment.
Figure 21:
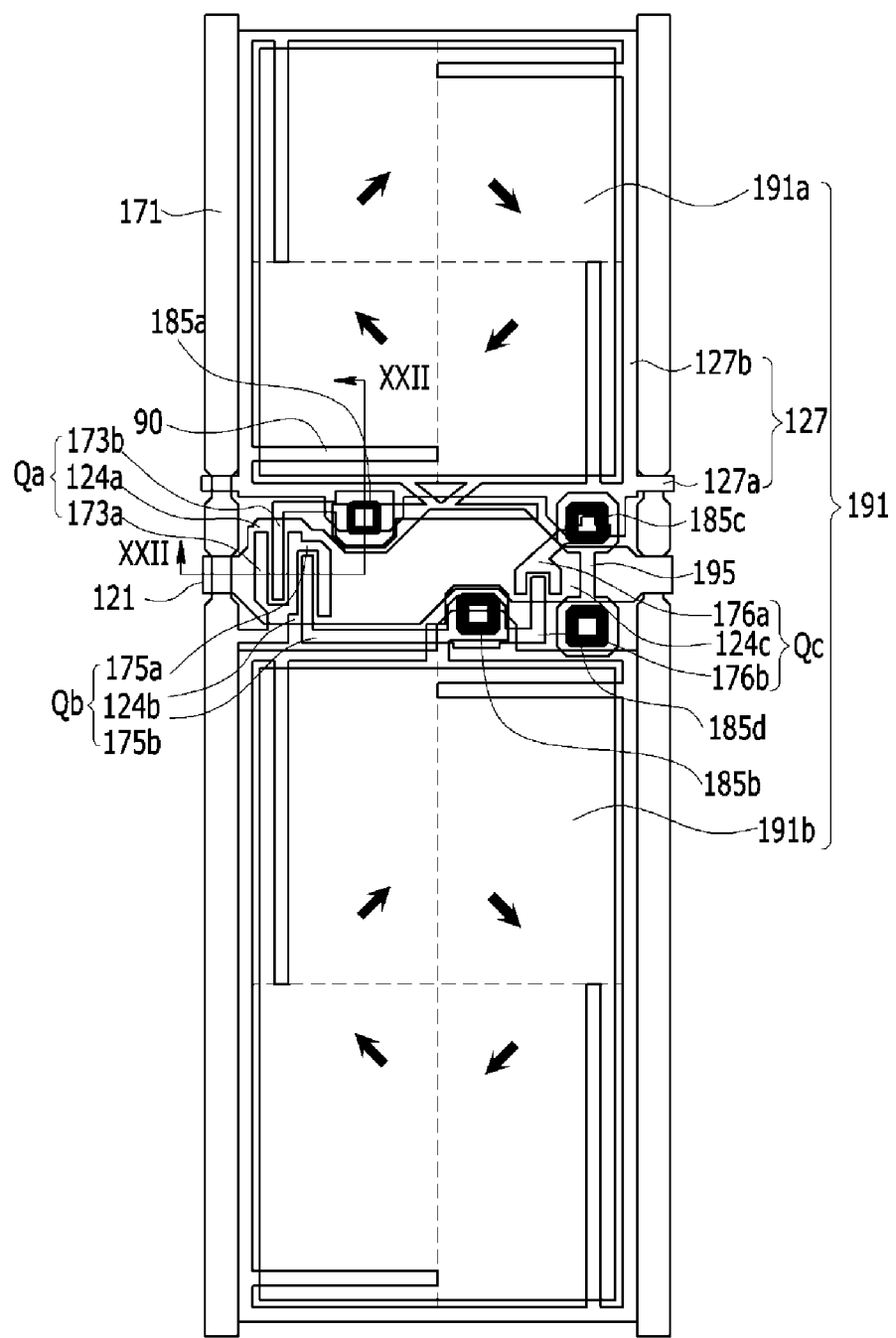
FIG. 21 is a schematic layout view of a pixel having an equivalent circuit shown in FIG. 20 according to an exemplary embodiment.
Figure 22:
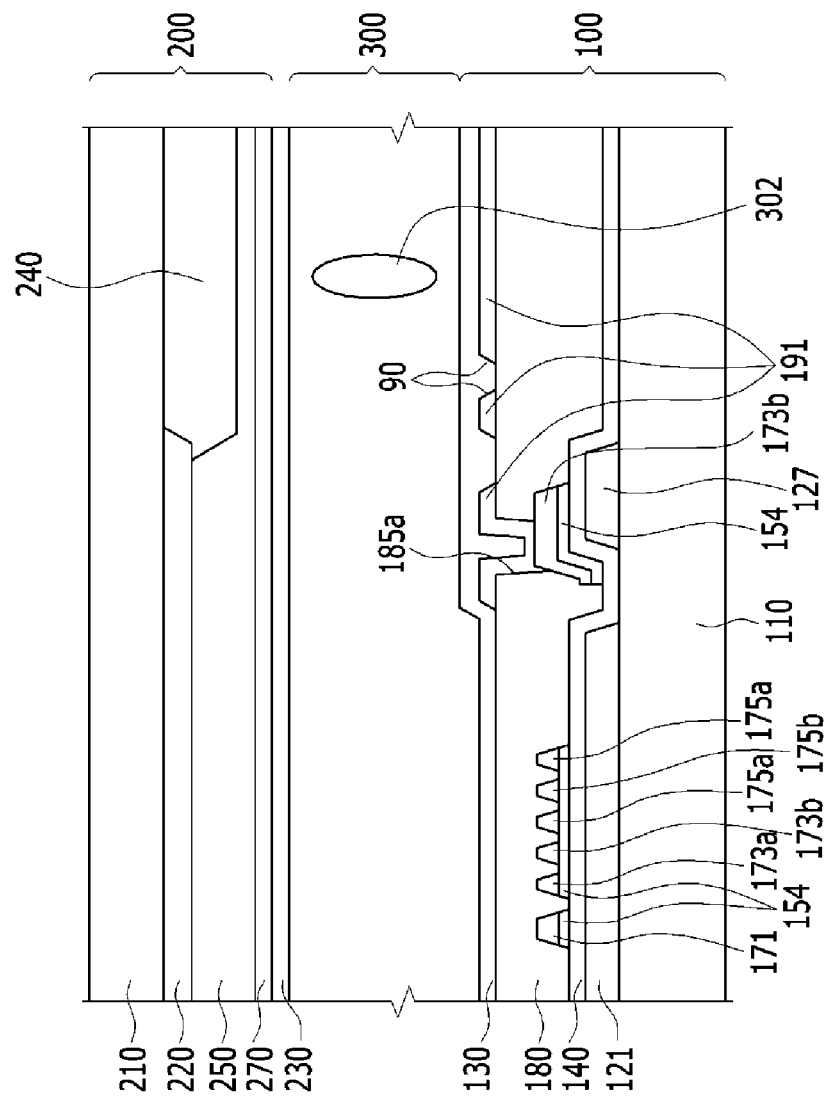
FIG. 22 is a schematic sectional view of the LCD shown in FIG. 21 taken along line XXII-XXII.

FIG. 20 is an equivalent circuit diagram of a pixel in an LCD according to another exemplary embodiment, FIG. 21 is a schematic layout view of a pixel having an equivalent circuit shown in FIG. 20 according to an exemplary embodiment, and FIG. 22 is a schematic sectional view of the LCD shown in FIG. 21 taken along line XXII-XXII.

Although FIG. 20 shows a pixel PX, and a gate line GL, a data line DL, and a reference voltage line RL related to the pixel PX for convenience of description, an LCD according to this exemplary embodiment may include a plurality of pixels that are arranged in a matrix including rows and columns and disposed near intersections of a plurality of gate lines extending in a row direction and a plurality of data lines extending in a column direction.

Referring to FIG. 20, the pixel PX of an LCD according to this exemplary embodiment includes a first switching element Qa, a second switching element Qb, and the third switching element Qc, which may be thin film transistors. The pixel PX further includes a first liquid crystal capacitor C1 and a second liquid crystal capacitor C2, which may include a dielectric of a liquid crystal layer.

The pixel PX is connected to a plurality of signal lines including the gate line GL to transmit a gate signal, the data line DL to transmit a data signal, and the reference voltage line RL to transmit a reference voltage for voltage division.

The pixel PX includes a first subpixel PEa and a second subpixel PEb. The first subpixel PEa includes the first switching element Qa and the first liquid crystal capacitor C1. The second subpixel PEb includes the second switching element Qb, the third switching element Qc, and the second liquid crystal capacitor C2.

Each of the first switching element Qa and the second switching element Qb includes a gate or a control terminal connected to the gate line GL, a source or an input terminal connected to the data line DL, and a drain or an output terminal connected to corresponding one of the first and second liquid crystal capacitors C1 and C2, respectively. The third switching element Qc includes a control terminal connected to the gate line GL, an input terminal connected to the reference voltage line RL, and an output terminal connected to the second liquid crystal capacitor C2.

The first liquid crystal capacitor C1 includes a first subpixel electrode 191a as one terminal connected to the drain of the first switching element Qa, and another terminal connected to a common voltage. The second capacitor C2 includes a second subpixel electrode 191b as one terminal connected to a connection CP between the output terminal of the second switching element Qb and the output terminal of the third switching element Qc, and another terminal connected to the common voltage.

When a gate on voltage Von is applied to the gate line GL, the first switching element Qa, the second switching element Qb, and the third switching element Qc connected to the gate line GL turn on. Then, a data voltage applied to the data line DL is transmitted to the first subpixel electrode 191a and the second subpixel electrode 191b via the first switching element Qa and the second switching element Qb, respectively. At this time, the voltage of the output terminal of the switching element Qa may be substantially the same as the data voltage, while the voltage of the output terminal of the second subpixel electrode 191b may be different from the data voltage. It is because the second switching element Qb and the third switching element Qc that are connected in series between the data voltage and the reference voltage may serve as resistors to divide the data voltage. Therefore, the voltage applied to the second subpixel electrode 191b may become smaller than the voltage applied to the first subpixel electrode 191a.

As a result, the second liquid crystal capacitor C2 becomes different from a voltage across the first liquid crystal capacitor C1, which causes tilt directions of the liquid crystal molecules in the first subpixel PEa and the second subpixel PEb to be different from each other, and thus the luminance of the two subpixels are different from each other. Therefore, an image in a lateral view may be closer to an image in a front view by adjusting the voltage across the first liquid crystal capacitor C1 and the voltage across the second liquid crystal capacitor C2, thereby improving lateral visibility.

Referring to FIG. 21 and FIG. 22, an LCD according to this exemplary embodiment includes a first panel 100, a second panel 200, and a liquid crystal layer 300 disposed between the first panel 100 and the second panel 200.

The first panel 100 includes a first substrate 110, a first switching element Qa, a second switching element Qb, a third switching element Qc, a gate line 121, a reference voltage line 127, a data line 171, and a pixel electrode 191. The gate line 121, the reference voltage line 127, the data line 171, and the pixel electrode 191 are electrically connected to at least one of the switching elements Qa, Qb and Qc. The pixel electrode 191 includes a first subpixel electrode 191a and a second subpixel electrode 191b.

The first substrate 110 may include an insulating material such as glass or plastic.

The gate line 121 and the reference voltage line 127 are disposed on the first substrate 110. The gate line 121 and the reference voltage line 127 may be made of a single conductive layer. For example, a conductive layer (not shown) is deposited on the first substrate 110 by sputtering, etc., and patterned by photolithography, etc., to form the gate line 121 and the reference voltage line 127. A plurality of portions or members formed by patterning a thin film as described above are referred to be "in the same layer level," and portions or members formed from different thin films are referred to be "in the different layer level," For example, the gate line 121 and the reference voltage line 127 are in the same layer level.

The gate line 121 extends in a transverse direction, and portions of the gate lines 121 disposed between the first subpixel electrode 191a and the second subpixel electrode 191b form a first gate electrode 124a, a second gate electrode 124b, and a third gate electrode 124c. The reference voltage line 127 includes a connection line 127a and a pair of ring parts 127b and 127c. The connection line 127a extends substantially parallel to the gate line 121, and electrically connects ring parts 127b of adjacent pixels. The ring parts 127b and 127c are connected to the connection line 127a and surround the first and second subpixel electrodes 191a and 191b, respectively.

A gate insulating layer 140 is disposed on the gate line 121 and the reference voltage line 127.

A semiconductor member 154 is disposed on the gate insulating layer 140. The semiconductor member 154 may include amorphous silicon or an oxide semiconductor.

A plurality of data conductive members in the same layer level are disposed on the semiconductor member 154. The plurality of data conductive members include the data line 171 extending in a longitudinal direction and crossing over the gate line 121, a first source electrode 173a and a second source electrode 175a connected to the data line 171, a first drain electrode 173b that faces the first source electrode 173a and is spaced apart from the first source electrode 173a, a second drain electrode 175b that faces the second source electrode 175a and is spaced apart from the second source electrode 175a, a third drain electrode 176b connected to the second drain electrode 1, and the third source electrode 176a that faces the third drain electrode 176b and is spaced apart from the third drain electrode 176b.

The first gate electrode 124a, the first source electrode 173a, and the first drain electrode 173b form a first thin film transistor Qa, and the second gate electrode 124b, the second source electrode 175a, and the second drain electrode 175b form a second thin film transistor Qb. The third gate electrode 124c, the third source electrode 176a, and the third drain electrode 176b form a third thin film transistor Qc. The channels of the thin film transistors Qa, Qb and Qc are formed in portions of the semiconductor member 154 disposed between the source electrodes 173a, 175a and 176a and the drain electrode 173b, 175b and 176b, respectively.

A passivation layer 180 is disposed on the data conductive members 171, 173a, 173b, 175a, 175b, 176a and 176b. The passivation layer 180 may have a flat surface. The passivation layer 180 has a first contact hole 185a, a second contact hole 185b, a third contact hole 185c, and a fourth contact hole 185d.

The pixel electrode 191 and a connection bridge 195 that may be in the same layer level and may include a transparent conductor are disposed on the passivation layer 180.

As described above, the pixel electrode 191 includes the first subpixel electrode 191a and the second subpixel electrode 191b. The first subpixel electrode 191a is electrically connected to the first drain electrode 173b through the first contact hole 185a, and the second subpixel electrode 191b is electrically connected to the second drain electrode 175b through the second contact hole 185b. The connection bridge 195 electrically connects the ring part 127c surrounding the second subpixel electrode 191b to the connection line 127a of the reference voltage line 127 through the third contact hole 185c and the fourth contact hole 185d.

Each of the first subpixel electrode 191a and the second subpixel electrode 191b has cutouts 90 extending along an edge thereof as described with reference to FIG. 1. Although FIG. 21 shows the cutouts 90 having a shape similar to those shown in FIG. 1, the cutouts 90 may have other shapes described above in the previous exemplary embodiments, for example, those shown in FIG. 14 and FIG. 17 based on the orientations of the liquid crystal molecules.

A first alignment layer 130 is disposed on the pixel electrode 191 and the connection bridge 195.

The second panel 200 includes a second substrate 210 facing the first substrate 110, a light blocking member 220, a color filter 240, an overcoat 250, a common electrode 270, and a second alignment layer 230.

The second substrate 210 may include a transparent glass or a plastic.

The light blocking member 220 is disposed on the second substrate 210. The light blocking member 220 is also referred to as a black matrix and may be configured to reduce or prevent light leakage. The light blocking member 220 may substantially not overlap the pixel electrode 191. For example, the light blocking member 220 may be disposed in an area corresponding to the gate line 121, the data line 171, and the reference voltage line 127.

The color filter 240 is disposed on the second substrate 210 and the light blocking member 220. The color filter 240 may be disposed mostly in an area surrounded by the light blocking member 220, and may extend in the transverse direction along the pixel electrode 191. The color filter 240 may represent one of the primary colors, for example, red color, green color, and a blue color. According to another exemplary embodiment, the color filter 240 may represent one of a cyan color, a magenta color, a yellow color, or a white color instead of the red, green, or the blue color.

One or both of the light blocking member 220 and the color filter 240 may be disposed in the first panel 100.

The overcoat 250 is disposed on the color filter 240 and the light blocking member 220. The overcoat 250 may include an insulator, may be configured to reduce or prevent the exposure of the color filter 240, and may have a flat surface. The overcoat 250 may be omitted.

The common electrode 270 is disposed on the overcoat 250.

The second alignment layer 230 is disposed on the common electrode 270. The first and second alignment layers 130 and 230 may be vertical alignment layers.

Although the LCD according to this exemplary embodiment includes three switching elements and one reference voltage line in order to provide the first subpixel electrode 191a and the second subpixel electrode 191b with different voltages, exemplary embodiments of the present invention are not limited thereto and may adapt other structures. According to an exemplary embodiment, the first subpixel electrode 191a and the second subpixel electrode 191b may be supplied with different voltages by providing individual data lines.

An LCD according to another exemplary embodiment is described in detail with reference to with reference to FIG. 23.

Figure 23:
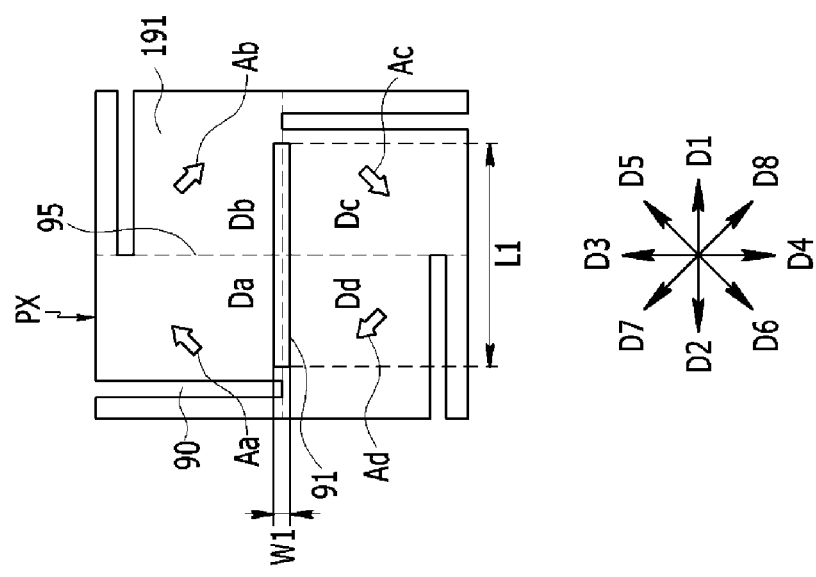
FIG. 23 is a schematic plan view of a pixel of an LCD according to another exemplary embodiment.

FIG. 23 is a schematic plan view of a pixel of an LCD according to another exemplary embodiment.

Referring to FIG. 23, a pixel PX of a liquid crystal display (LCD) according to another exemplary embodiment may be substantially the same as the pixel PX of the LCD described above with reference to FIG. 1 and FIG. 2, except for a cutout 91 disposed in a pixel electrode 191. Detailed description of same elements will be omitted.

The cutout 91 extends in the first direction D1 along a boundary between a first domain Da and a fourth domain Dd and along a boundary between a second domain Db and a third domain Dc.

The cutout 91 does not meet an edge of the pixel electrode 191, and a length L1 of the cutout 91 in the first direction D1 may be smaller than a length of the pixel electrode 191 in the first direction D1. Therefore, the pixel electrode 191 is not divided so that an entire portion of the pixel electrode 191 is supplied with a switching element.

In the absence of the cutout 91, liquid crystal molecules disposed near the boundary of the first domain Da and the fourth domain Dd may be aligned in the third direction D3, and liquid crystal molecules disposed near the boundary of the second domain Db and the third domain Dc may be aligned in the fourth direction D4. Therefore, the lateral retardation near the boundary of the first domain Da and the fourth domain Dd and near the boundary of the second domain Db and the third domain Dc may be increased, thereby decreasing visibility.

The pixel electrode 191 having the cutout 91 as in this exemplary embodiment generates fringe fields near the boundary of the first domain Da and the fourth domain Dd and near the boundary of the second domain Db and the third domain Dc. The fringe fields may reduce the number of the molecules aligned in the third direction D3 near the boundary of the first domain Da and the fourth domain Dd and the number of the molecules aligned in the fourth direction D4 near the boundary of the second domain Db and the third domain Dc. Therefore, the lateral retardation may be reduced to improve the visibility.

A width W1 of the cutout 91 may be about 2 μm to about 4.5 μm. When the width W1 is in a range from about 2 μm to about 4.5 μm, the visibility may be improved without decreasing the transmittance of the pixel PX. When the width W1 of the cutout 91 is equal to or greater than 6 μm, the strength of the fringe fields may be so high to decrease the visibility and the transmittance.

Hereinafter, an LCD according to another exemplary embodiment will be described in detail with reference to FIG. 24.

Figure 24:
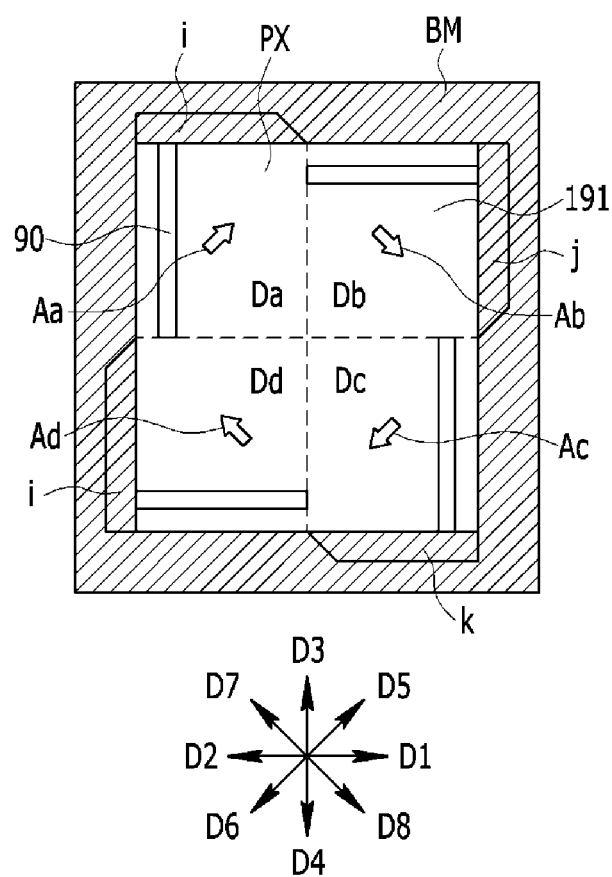
FIG. 24 is a schematic plan view of a pixel and a light blocking area of an LCD according to another exemplary embodiment.

FIG. 24 is a schematic plan view of a pixel and a light blocking area of an LCD according to another exemplary embodiment.

Referring to FIG. 24, a pixel PX of a liquid crystal display (LCD) according to another exemplary embodiment may be substantially the same as the pixel PX of the LCD described above with reference to FIG. 1 and FIG. 2, except that head-side edge portions of the pixel electrode 191 in each of the domains Da, Db, Dc and Dd expand forward in a light blocking area BM. Detailed description of same elements will be omitted.

Referring to FIG. 24, the light blocking area BM surrounds the pixel PX. The light blocking area BM may not transmit light, and may include the light blocking member 220 shown in FIG. 21 and FIG. 22. The pixel electrode 191 includes expansions i, j, k and l overlapping the light blocking area BM. The expansions i, j, k and l may be formed by expanding or protruding the head-side edge portions of the pixel electrode 191 disposed close to the heads of the average director Aa, Ab, Ac and Ad of the domains Da, Db, Dc and Dd toward the light blocking area BM.

The liquid crystal molecules near edges of the pixel electrode 191 may be aligned irregularly due to the fringe fields, which cause textures to be generated along some portions of the edges of the pixel electrode 191, thereby decreasing the transmittance. However, in this exemplary embodiment, the expansions i, j, k and l of the pixel electrode 191 overlap the light blocking area BM, and thus the textures near the edge regions may be covered by the light blocking area BM.

In this exemplary embodiment, cutouts 90 of the pixel electrode 191 extend along tail-side edge portion of the domains Da, Db, Dc and Dd as described above with reference to FIG. 1 and FIG. 2. The cutouts 90 may cause the irregular orientations of the liquid crystal molecules in the edge region to be changed into the average orientation, thereby increasing light transmittance.

For example, the head-side edge portion disposed close to the heads of the average director Aa in the first domain Da is covered by the light blocking area BM as a portion of the expansion i, and the cutout 90 is disposed along the tail-side edge portion. Similarly, the head-side edge portions disposed close to the heads of the average directors Ab, Ac and Ad in other domains Db, Dc and Dd are covered by the light blocking area BM as portions of the expansions j, k and l, and the cutout 90 is disposed along the tail-side edge portions.

While this disclosure has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display, comprising:
a plurality of pixels,
wherein a pixel of the plurality of pixels comprises:
a pixel electrode;
a common electrode;
at least one alignment layer on at least one of the pixel electrode and the common electrode; and
a liquid crystal layer between the pixel electrode and the common electrode, the liquid crystal layer comprising a plurality of liquid crystal molecules, and
wherein:
the pixel comprises a plurality of domains including a first domain and a second domain adjacent to each other with a boundary, each of the plurality of domains having an average orientation of the liquid crystal molecules in a plan view, the average orientations of the liquid crystal molecules of the plurality of domains being different from each other,
the boundary between the first domain and the second domain extends in a first direction,
the first domain is defined by the boundary and a first edge of the pixel electrode,
the second domain is defined by the boundary and a second edge of the pixel electrode,
the first edge and the second edge extend in the first direction and oppose each other with the boundary interposed therebetween,
the first edge is close to a tail of an average director of the first domain,
the first domain has only one continuous first opening comprising a first portion, two opposing edges of the first portion of the first opening extending in the first direction in the plan view,
the first opening is spaced apart from the first edge, and
a first distance between the first opening and the first edge is less than a second distance between the first opening and the boundary.

2. The liquid crystal display of claim 1, wherein the first opening has a width equal to or smaller than twice a thickness of the liquid crystal layer.

3. The liquid crystal display of claim 2, wherein the first opening is spaced apart from the first edge by a distance equal to smaller than twice the thickness of the liquid crystal layer.

4. The liquid crystal display of claim 3, wherein the first opening further comprises a portion extending substantially in a second direction perpendicular to the first direction.

5. The liquid crystal display of claim 3, wherein:
the first portion extends from a transverse center line of the pixel electrode,
the first opening further comprises a second portion extending from a longitudinal center line of the pixel electrode, and the first portion and the second portion of the first opening meet each other near a corner of the pixel electrode.

6. The liquid crystal display of claim 5, wherein the first opening is disposed near a first corner of the pixel electrode, and the pixel electrode further has a second opening disposed at a second corner of the pixel electrode opposing the first corner in a diagonal direction of the pixel electrode.

7. The liquid crystal display of claim 6, wherein the pixel electrode further comprises third and fourth openings disposed near third and fourth corners of the pixel electrode, respectively.

8. The liquid crystal display of claim 1, wherein the pixel electrode comprises a cutout extending along a transverse center line of the pixel electrode, and the cutout has a length in a transverse direction substantially parallel to the transverse center line shorter than a length of the pixel electrode in the transverse direction.

9. The liquid crystal display of claim 1, wherein:
an entire area of the pixel is surrounded by a light blocking area, and
a portion of an edge of the pixel electrode other than the first edge overlaps the light blocking area.

10. A liquid crystal display, comprising:
a first substrate;
a second substrate facing the first substrate;
a pixel electrode on the first substrate;
a common electrode on the second substrate; and
a liquid crystal layer between the pixel electrode and the common electrode, the liquid crystal layer comprising a plurality of liquid crystal molecules,
wherein:
a pixel comprising the pixel electrode is divided into a plurality of domains including a first domain and a second domain adjacent to each other with a boundary, each of the plurality of domains has an average orientation of the liquid crystal molecules in a plan view, and the average orientations of the liquid crystal molecules of the plurality of domains are different from each other,
the boundary between the first domain and the second domain extends in a first direction,
the first domain is defined by the boundary and a first edge of the pixel electrode,
the second domain is defined by the boundary and a second edge of the pixel electrode,
the first edge and the second edge extend in the first direction and oppose each other with the boundary interposed therebetween,
the first edge is close to a tail of an average director of the first domain,
the first domain has only one continuous opening, two opposing edges of the opening extending in the first direction in the plan view,
the pixel electrode has a continuous surface except for the opening,
the common electrode has a continuous surface,
the opening is spaced apart from the first edge, and
a first distance between the first opening and the first edge is less than a second distance between the first opening and the boundary.

11. The liquid crystal display of claim 10, wherein the opening has a width equal to or smaller than twice a thickness of the liquid crystal layer.

12. The liquid crystal display of claim 11, wherein the opening is spaced apart from the first edge by a distance equal to smaller than twice the thickness of the liquid crystal layer.

13. The liquid crystal display of claim 1, wherein the first opening extends in a direction different from and not perpendicular to the average director of the first domain.

14. The liquid crystal display of claim 1, wherein:
the second domain comprises a second opening,
the second opening extends in a second direction perpendicular to the first direction,
the second opening is spaced apart from a third edge of the pixel electrode, the third edge extending in the second direction,
the third edge is close to a tail of an average director of the second domain, and
a third distance between the second opening and the third edge is less than a fourth distance between the second opening and a boundary between the second domain and a third domain adjacent to the second domain.

* * * * *